US011238253B2

(12) United States Patent
Arnold

(10) Patent No.: US 11,238,253 B2
(45) Date of Patent: Feb. 1, 2022

(54) SCANNING DEVICE WITH ERGONOMIC FEATURES

(71) Applicant: Hewlett-Packard Development Company, L.P., Spring, TX (US)

(72) Inventor: Jesse Arnold, Houston, TX (US)

(73) Assignee: Hewlett-Packard Development Company, L.P., Spring, TX (US)

(*) Notice: Subject to any disclaimer, the term of this patent is extended or adjusted under 35 U.S.C. 154(b) by 160 days.

(21) Appl. No.: 16/500,105

(22) PCT Filed: Apr. 4, 2017

(86) PCT No.: PCT/US2017/025953
§ 371 (c)(1),
(2) Date: Oct. 2, 2019

(87) PCT Pub. No.: WO2018/186839
PCT Pub. Date: Oct. 11, 2018

(65) Prior Publication Data
US 2021/0133408 A1 May 6, 2021

(51) Int. Cl.
*G06K 7/10* (2006.01)
(52) U.S. Cl.
CPC ....... *G06K 7/10851* (2013.01); *G06K 7/1098* (2013.01)
(58) Field of Classification Search
CPC .......................... G06K 7/10851; G06K 7/1098
USPC ........................................................ 235/454
See application file for complete search history.

(56) References Cited

U.S. PATENT DOCUMENTS

| 4,820,911 | A | 4/1989 | Arackellian et al. |
| 5,369,262 | A * | 11/1994 | Dvorkis ............. G06F 3/03543 235/440 |
| 5,763,865 | A * | 6/1998 | Swift ................. G06K 7/10881 235/383 |
| 5,939,702 | A | 8/1999 | Knighton et al. |
| 6,481,628 | B2 | 11/2002 | Liou et al. |
| 6,581,838 | B1 | 6/2003 | Meksavan et al. |
| 6,641,044 | B2 | 11/2003 | Plesko |
| 8,027,096 | B2 * | 9/2011 | Feng ........................ G02B 3/12 359/666 |
| 10,453,047 | B2 * | 10/2019 | Hicks .................... G07G 1/0081 |
| 2011/0096372 | A1 | 4/2011 | Crucs |

FOREIGN PATENT DOCUMENTS

| RU | 1837334 A1 | 8/1993 |
| RU | 2439701 C2 | 5/2010 |

OTHER PUBLICATIONS

Motorola Cs1504 Wireless Barcode Scanner, < https://www.piicomm.com/wireless-barcode-scanners/>.

* cited by examiner

*Primary Examiner* — Michael G Lee
*Assistant Examiner* — David Tardif
(74) *Attorney, Agent, or Firm* — Michael A. Dryja

(57) ABSTRACT

Examples disclosed herein provide a scanning device with ergonomic features. As an example, the scanning device includes a rear housing section, a grip housing section, and a lower housing section, all coupled to each other. The rear housing section includes a trigger disposed on an end of the rear housing section, for activating the scanning device. A perimeter of the grip housing section includes the ergonomic features, and an end of the lower housing section opposite from the end of the rear housing section includes an optical scanner.

19 Claims, 3 Drawing Sheets

SCANNING DEVICE WITH ERGONOMIC FEATURES

BACKGROUND

Electronic switches may be used in circuits to selectively complete the circuit and activate elements of the circuit. An electronic switch may be selectively completed using a trigger mechanism which may complete the circuit through manipulation. As an example, on a scanning device, such as a barcode scanner, a trigger may be used to complete a circuit via an electronic switch.

DETAILED DESCRIPTION

Examples disclosed herein provide a scanning device with ergonomic features that allow for a user to handle the scanning device in a particular orientation that is advantageous for a number of use cases. The orientation that the scanning device is handled allows for the user to maintain a straight wrist and a neutral grip, such as a comfortable, full-fisted grip. As an example, instead of aiming the scanning device using wrist adjustments, the user would aim the scanning device using mostly elbow and shoulder adjustments. As a result, wrist fatigue and any related complications may be avoided. As will be further described, the ergonomic features around a perimeter of the scanning device may allow for the hand of the user to have exposure to the ambient air of the environment, allowing for convective heat transfer to occur. This may be particularly useful in high-use scenarios and warm atmospheres, so as to help the user maintain a comfortable, perspiration-free hand.

Figure 1A:
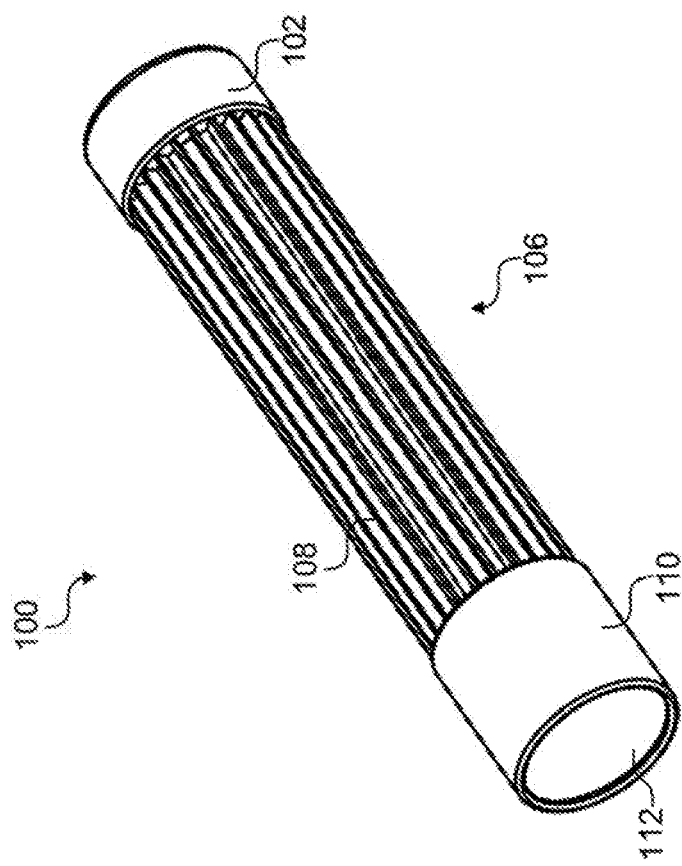
FIGS. 1A-B illustrate a scanning device with ergonomic features around a perimeter of the scanning device, according to an example.
Figure 1B:
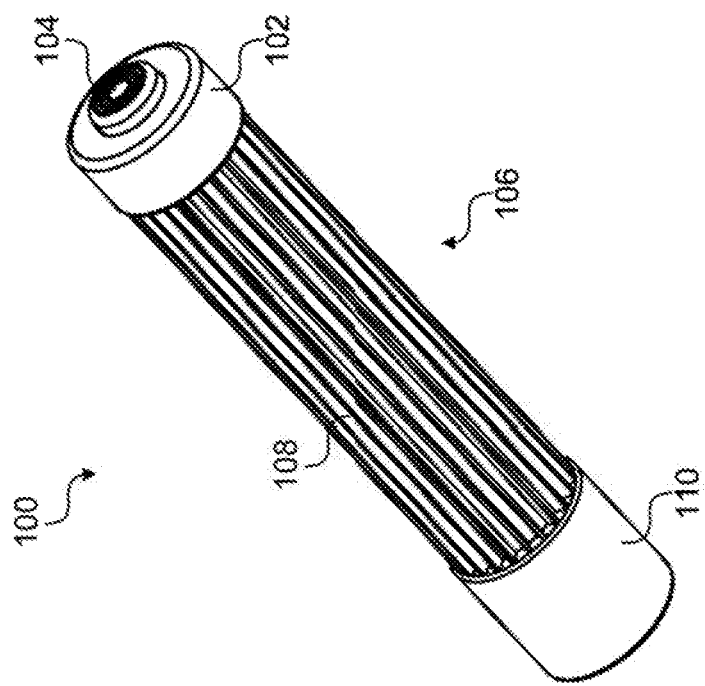

With reference to the figures, FIGS. 1A-B illustrate a scanning device 100 with ergonomic features 108 around a perimeter of the scanning device 100, according to an example. As illustrated, the scanning device 100 includes a rear housing section 102, a grip housing section 106, and a lower housing section 110, all coupled to each other. As an example, the sections 102, 106, 110 are cylindrical and threaded to each other. As an example, the sections 102, 106, 110 may be made of metal, such as an aluminum alloy, for its relatively low density compared to other production metals and its relatively high durability compared to most production plastics.

An end of the lower housing section 110 may include an optical scanner 112. As used herein, an optical scanner refers to a device that uses a light beam to recognize characters or patterns printed on a surface (e.g., a barcode pattern). In some examples, an optical scanner may use a laser to detect and recognize the characters or patterns. In some examples, non-visible light beams, such as an infrared beam, may be used. In some examples, the light beam may include a targeting pattern. A light beam may be aligned to and/or based on the targeting pattern, such as alignment to and/or based on the characters and/or patterns of the targeting pattern.

As an example, a trigger 104 for activating the scanning device 100 may be disposed on an end of the rear housing section 102, opposite from the end of the lower housing section 110. As an example, the trigger 104 may be rubberized, made from thermoplastic elastomers (TPE). By having the trigger 104 and optical scanner 112 on opposite ends of the scanning device 100, a user may naturally grip the scanning device 100 with their thumb nearest to the trigger 104, and wrap remaining fingers of the hand around the grip housing section 106 of the scanning device 100, in a concentric fashion around the scanning device 100. As an example, the remaining fingers are in a plane parallel to the optical scanner 112. By maintaining a neutral or full-fisted grip with a straight wrist, the user may point the optical scanner 112 at the desired objects to be scanned (e.g., barcode pattern), making aiming adjustments by pivoting the elbow and swiveling the shoulder of their scanning hand. As a result, wrist fatigue and any related complications may be avoided.

Once aimed, the user may activate the scanning device 100 by depressing the trigger 104 with the end of their thumb. As an example, upon capturing the barcode pattern via the optical scanner 112, information stored in the barcode pattern would then be read by a processor of the scanning device 100, and communicated to a central computing device via a wireless medium, such as via Bluetooth. Upon scanning the barcode pattern, the user may release the trigger 104, in order to deactivate the scanning device 100.

As illustrated, the grip housing section 106 includes ergonomic features 108. As an example, the ergonomic feature 108 include long rubber fins along the perimeter of the grip housing section 106, to optimize the ergonomics of the scanning device 100 while it is held in a hand of a user for use. By incorporating ergonomic features 108 such as the rubber fins, the user is offered more grip comfort. In addition, the rubber fins may allow for the hand of the user to have exposure to the ambient air of the environment, allowing for convective heat transfer to occur. This may be especially useful in high-use scenarios and warm atmospheres, so as to help the user maintain a comfortable, perspiration-free hand.

Referring to FIGS. 1A-B, the default state of the scanning device 100 is in a deactivated mode, requiring for a user to depress the trigger 104 when desiring to recognize characters or patterns printed on a surface, such as a barcode pattern. When the user releases the trigger 104, the scanning device 100 returns to the deactivated mode. However, at times, a user may desire for the scanning device 100 to be active without having to keep the trigger 104 depressed. As an example, the trigger 104 may provide a bistable system, similar to a click pen. For example, one press of the trigger 104 may activate the optical scanner 112 for continuous scanning. When the user is finished scanning with the scanning device 100, another press of the trigger 104 may deactivate the optical scanner 112.

Figure 2A:
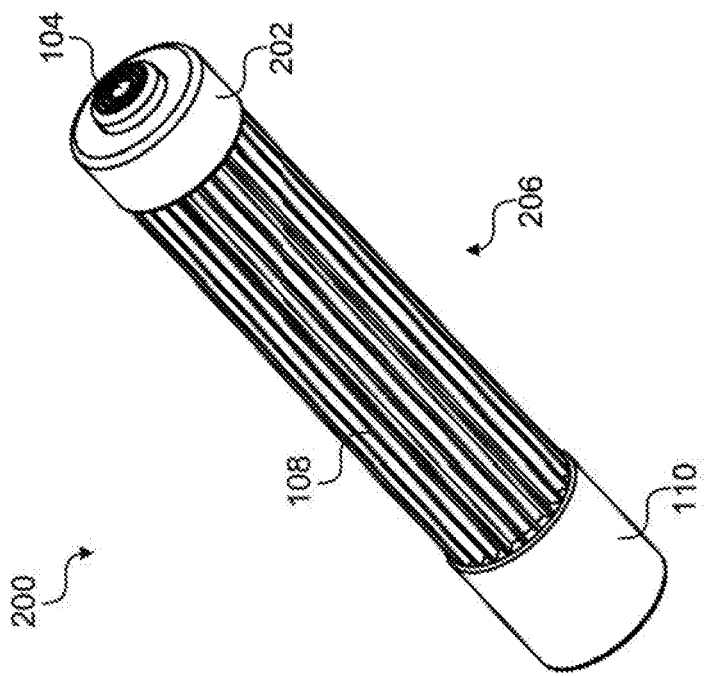
FIGS. 2A-B illustrate a scanning device that provides a user with the ability to activate the scanning device without use of a trigger, according to an example.
Figure 2B:
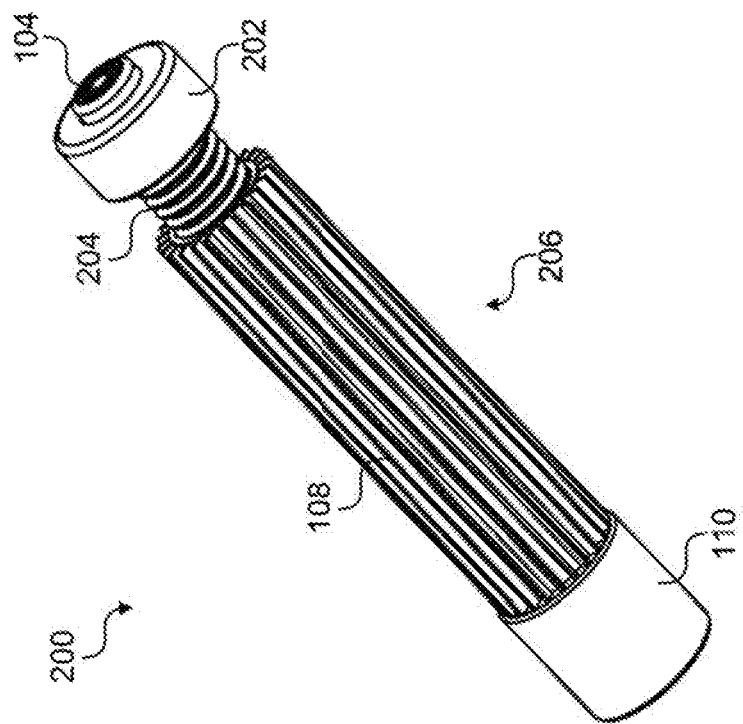

FIGS. 2A-B illustrate a scanning device 200 that provides a user with the ability to activate the scanning device 200 without use of the trigger 104, according to an example. Elements in FIGS. 2A-B may share the reference numeral of similar elements in FIGS. 1A-B. As mentioned above, a user may desire for a scanning device to be active without having to keep the trigger depressed. As an example, a rear housing section 202 and a grip housing section 206 of the scanning device 200 includes additional thread 204 for threading the rear housing section 202 further onto the grip housing section 206, for example, compared to the rear housing section 102 and grip housing section 106 of scanning device 100. By utilizing the additional thread 204 to thread the rear housing section 202 further onto the grip housing section 206, as illustrated in FIG. 2B, the scanning device 200 may be activated into a continuous scanning state, irrespective of any press of the trigger 104. When the user is finished scanning with the scanning device 200, unscrewing the rear housing section 202 from the additional thread 204, as illustrated in FIG. 2A, may deactivate the scanning device 200. However, pressing and releasing the trigger 104 when the additional thread 204 is exposed may activate and deactivate the scanning device 200, similar to the scanning device 100 described above, FIG. 3 illustrates internal components of a scanning device 300, according to an example. Elements in FIG. 3 may share the reference numeral of similar elements in FIGS. 1A-2B. As an example, the internal components of scanning device 300 may be used for activating and deactivating the scanning device 100 of FIGS. 1A-B and scanning device 200 of FIGS. 2A-B, as will be further described. As mentioned above, electronic switches may be used in circuits to selectively complete the circuit and activate elements of the circuit (e.g., optical scanner 112). An electronic switch may be selectively completed using a trigger mechanism which may complete the circuit through manipulation.

As illustrated, an electronic switch includes circuit board 306, a first conductive surface 304 coupled to the circuit board 306, and a second conductive surface 302 located proximate to the first conductive surface 304. In its default state, a distance 310 is maintained between the first and second conductive surfaces 304, 302. As an example, referring back to FIG. 1A, when trigger 104 is not engaged, distance 310 is maintained between the first and second conductive surfaces 304, 302. Similarly, referring back to FIG. 2A, when the additional thread 204 is exposed and the trigger 104 is not engaged, distance 310 is maintained between the first and second conductive surfaces 304, 302. However, distance 310 may decrease when either the trigger 104 is depressed or when the rear housing section 202 is threaded further onto the grip housing section 206 via the additional thread 204. When the second conductive surface 302 is to make contact with the first conductive surface 304, a circuit located on the circuit board 306 may close, or be completed. In such an example, the contact of the first conductive surface 304 and the second conductive surface 302 may cause activation of an element of the circuit board 306, such as the optical scanner 112, as will be further described.

As used herein, a circuit board refers to a board which mechanically supports and electrically connects electronic components using conductive tracks, pads and/or other features. For instance, circuit board 306 may include copper tracks and conductive surfaces attached to a substrate. Various electrical components, such as capacitors and resistors, may be soldered to circuit board 306. As mentioned, circuit board 306 may be coupled to a first conductive surface 304. As used herein, a conductive surface refers to a surface containing a metallic or other type of coating suitable for conducting electricity. That is, in various examples, the conductive surfaces 302, 304 may be a metallic coating on a substrate.

Figure 3:
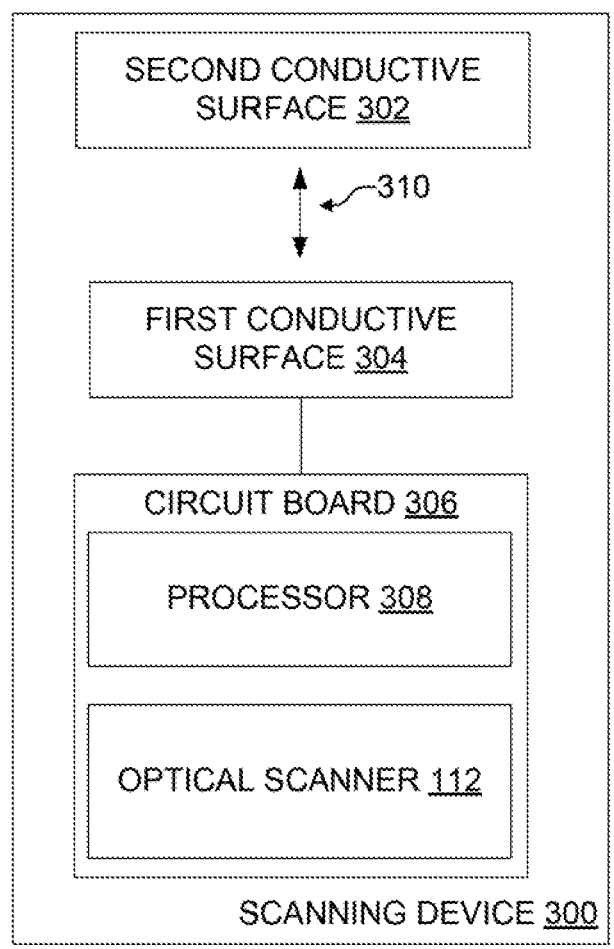
FIG. 3 illustrates internal components of a scanning device, according to an example.

As shown in FIG. 3, optical scanner 112 may be coupled to circuit board 306. In some examples, circuit board 306 may control optical scanner 112. Said differently, optical scanner 112 may be activated upon activation of circuit board 306. Thus, when circuit board 306 is activated by the contact of the first conductive surface 304 and the second conductive surface 302, circuit board 306 may activate optical scanner 112.

Optical scanner 112 may be deactivated by the circuit board 306 in response to the first conductive surface 304 breaking contact with the second conductive surface 302. In some examples, the first conductive surface 304 and the second conductive surface 302 may break contact when either the trigger 104 is released or the rear housing section 202 of FIG. 2A is unscrewed from the additional thread 204, restoring distance 310 and breaking contact between the first conductive surface 304 and the second conductive surface 302. In such an example, circuit board 306 may be deactivated and thus may case optical scanner 112 to deactivate.

Scanning device 300 may further include a processor 308. Processor 308 may be a hardware processor such as a central processing unit (CPU), a semiconductor based microprocessor, and/or other hardware devices suitable for retrieval, reception, and/or execution of instructions. In some examples, processor 308 may be coupled to circuit board 306. In such examples, processor 308 may be activated upon activation of circuit board 306. That is, processor 308 may be activated when the first conductive surface 304 contacts the second conductive surface 302 to activate circuit board 306. In some examples, processor 308 may be activated in response to activation of optical scanner 112.

In some examples, processor 308 may be coupled to optical scanner 112. In such examples, processor 308 may receive information and instructions from optical scanner 112. For example, when optical scanner 112 is activated, optical scanner may capture a pattern. Processor 308 may then receive the captured pattern from optical scanner 112. In some examples, processor 308 may further read, interpret, or decode the pattern captured by optical scanner 112. For example, optical scanner 112 may capture a barcode pattern and transmit the captured barcode pattern to processor 308. Processor 308 may then interpret and decode the barcode pattern. Processor 308 may further determine that the barcode pattern captured by optical scanner 112 corresponds to a particular product or item.

It is appreciated that examples described may include various components and features. It is also appreciated that numerous specific details are set forth to provide a thorough understanding of the examples. However, it is appreciated that the examples may be practiced without limitations to these specific details. In other instances, well known methods and structures may not be described in detail to avoid unnecessarily obscuring the description of the examples. Also, the examples may be used in combination with each other.

Reference in the specification to "an example" or similar language means that a particular feature, structure, or characteristic described in connection with the example is included in at least one example, but not necessarily in other examples. The various instances of the phrase "in one example" or similar phrases in various places in the specification are not necessarily all referring to the same example.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed is:

1. A scanning device comprising:
   a rear housing section comprising a trigger for activating the scanning device, wherein the trigger is disposed on an end of the rear housing section;
   a grip housing section coupled to the rear housing section, the grip housing section comprising a plurality of rubber fins radially extending from a central axis of the grip housing section around a perimeter of the grip housing section and adapted to permit gripping of the grip housing section while still exposing a gripping surface to ambient air; and
   a lower housing section coupled to the grip housing section, wherein an end of the lower housing section opposite from the end of the rear housing section comprises an optical scanner.

2. The scanning device of claim 1, wherein the rear housing section, grip housing section, and lower housing section are cylindrical.

3. The scanning device of claim 2, wherein the rear housing section, grip housing section, and lower housing section are threaded to each other.

4. The scanning device of claim 3, wherein the rear housing section and the grip housing section comprises additional thread to thread the rear housing section further onto the grip housing section, wherein threading the rear housing section further onto the grip housing section is to activate the optical scanner without use of the trigger.

5. The scanning device of claim 1, wherein when the trigger is to be depressed, the optical scanner is activated for capturing a barcode pattern.

6. The scanning device of claim 1, wherein when a thumb on a hand of a user is used to depress the trigger, remaining fingers of the hand are to be wrapped around the grip housing section, in a concentric fashion around the scanning device.

7. The scanning device of claim 6, wherein the remaining fingers are in a plane parallel to the optical scanner.

8. A scanning device comprising:
   a rear housing section comprising a trigger for activating the scanning device, wherein the trigger is disposed on an end of the rear housing section;
   a grip housing section coupled to the rear housing section, wherein a perimeter of the grip housing section comprises ergonomic features;
   a lower housing section coupled to the grip housing section, wherein an end of the lower housing section opposite from the end of the rear housing section comprises an optical scanner to capture a barcode pattern;
   a circuit board disposed within the scanning device;
   a first conductive surface coupled to the circuit board;
   a second conductive surface located proximate to the first conductive surface, wherein the circuit board is to activate the optical scanner when the second conductive surface is to contact the first conductive surface; and
   a processor to read the captured barcode pattern,
   wherein the circuit board is to deactivate the optical scanner when the second conductive surface is to break contact with the first conductive surface, and the rear housing section, grip housing section, and lower housing section are threaded to each other,
   and wherein the rear housing section and the grip housing section comprise additional thread to thread the rear housing section further onto the grip section, wherein threading the rear housing section further onto the grip section is to cause the second conductive surface to make contact with the first conductive surface.

9. The scanning device of claim 8, wherein depression and release of the trigger is to cause the second conductive surface to make contact and break contact with the first conductive surface, respectively.

10. The scanning device of claim 8, wherein unscrewing the rear housing section from the additional thread is cause the second conductive surface to break contact with the first conductive surface.

11. The scanning device of claim 8, wherein the processor is activated in response to activation of the optical scanner.

12. A scanning device comprising:
    a grip housing section;
    a first end housing section disposed at a first end of the grip housing section and comprising an optical scanner disposed at an end of the first grip section defining a first end of the scanning device; and
    a second end housing section disposed at a second end of the grip housing section opposite the first end of the grip housing section and comprising a trigger for activating the optical scanner disposed at an end of the second end housing section defining a second end of the scanning device opposite the first end of the scanning device.

13. The scanning device of claim 12, wherein the grip housing section, the first end housing section, and the second end housing section are each cylindrical.

14. The scanning device of claim 13, wherein the rear housing section, the first end housing section, and the second end housing section are threaded to each other.

15. The scanning device of claim 14, wherein the grip housing section and the second end housing section comprises additional thread to thread the second end housing section further onto the grip housing section, wherein threading the second end housing section further onto the grip housing section is to activate the optical scanner without use of the trigger.

16. The scanning device of claim 13, wherein the grip housing section comprises a plurality of rubber fins radially extending from a central axis of the grip housing section around a perimeter of the grip housing section and adapted to permit gripping of the grip housing section while still exposing a gripping surface to ambient air.

17. The scanning device of claim 12, wherein when the trigger is to be depressed, the optical scanner is activated for capturing a barcode pattern.

18. The scanning device of claim 12, wherein when a thumb on a hand of a user is used to depress the trigger, remaining fingers of the hand is to be wrapped around the grip housing section, in a concentric fashion around the scanning device.

19. The scanning device of claim 18, wherein the remaining fingers are in a plane parallel to the optical scanner.

* * * * *